United States Patent [19]

Crawford

[11] Patent Number: 4,634,298
[45] Date of Patent: Jan. 6, 1987

[54] SELF-ALIGNING BEARING RETENTION SYSTEM

[75] Inventor: Bradly A. Crawford, American Township, Allen County, Ohio

[73] Assignee: A. O. Smith Corporation, Milwaukee, Wis.

[21] Appl. No.: 765,471

[22] Filed: Aug. 14, 1985

[51] Int. Cl.$^4$ ............................................. F16C 23/04
[52] U.S. Cl. ..................................... 384/209; 384/214
[58] Field of Search ............... 384/209, 210, 208, 207, 384/214, 213; 310/88, 90

[56] References Cited

U.S. PATENT DOCUMENTS

| | | |
|---|---|---|
| 2,011,493 | 8/1935 | Larsh . |
| 2,448,500 | 8/1948 | Turner . |
| 3,714,705 | 2/1973 | Lewis ................................... 29/596 |
| 3,866,986 | 2/1975 | Helper . |
| 3,966,278 | 6/1976 | Lewis . |
| 4,008,928 | 2/1977 | Abel . |
| 4,014,596 | 3/1977 | Kazama . |
| 4,074,158 | 2/1978 | Cole ....................................... 310/90 |
| 4,090,749 | 5/1978 | Daniels . |
| 4,166,658 | 9/1979 | Glass . |
| 4,219,245 | 8/1980 | Lewis . |
| 4,355,250 | 10/1982 | Langdon .............................. 310/88 |
| 4,362,342 | 12/1982 | Busher et al. . |

*Primary Examiner*—Lenard A. Footland
*Attorney, Agent, or Firm*—Andrus, Sceales, Starke & Sawall

[57] ABSTRACT

A self-aligning bearing assembly particularly suited for use in a fractional horsepower electric motor includes a bearing having a partially spherical outer surface and a central hole for rotatably journaling a shaft therein. A housing defining a generally cylindrical opening having an internal surface which is radially spaced from the bearing, also defines a bearing seat adjacent to and conforming in shape with a portion of the outer surface of the bearing. The housing further includes a lip extending radially inward from the internal surface of the cylindrical opening. A spring bearing retainer of resilient flexible sheet-like material and having a generally planar body is inserted into the cylindrical opening. The retainer includes a plurality of radially deformable projections which extend outwardly from the body and has a central aperture for engagement with a second portion of the outer surface of the bearing. The lip on the internal surface of the housing cylindrical opening is so constructed that as the bearing retainer is moved axially into the opening toward the bearing seat, the projections deform radially inward in the vicinity of the ridge, the retainer body deforms axially and the retainer exerts a force against the lip and resiliently retains the bearing against the bearing seat.

6 Claims, 6 Drawing Figures

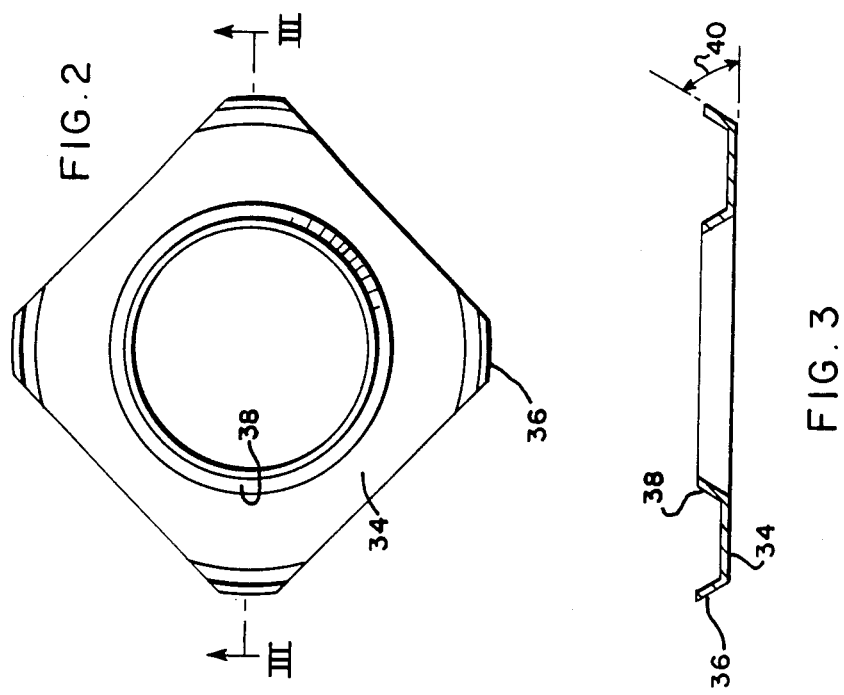
FIG. 2
FIG. 3
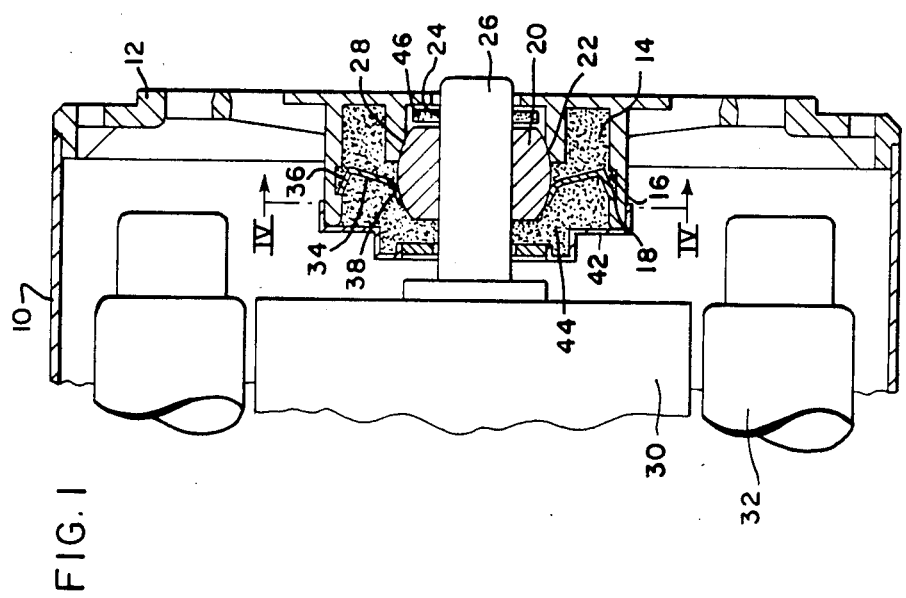
FIG. 1

SELF-ALIGNING BEARING RETENTION SYSTEM

BACKGROUND OF THE INVENTION

This invention relates to bearing assemblies for electric motors and more particularly to self-aligning bearing retention systems.

Fractional horsepower electric motors typically include either a pair of cast aluminum or sheet steel end bells that support bearing assemblies into which the motor shaft is rotatably journaled. Misalignment of the rotor shaft and associated bearings can result in tight motors in which the shaft cannot rotate freely. To avoid the tight motor problem, self-aligning bearing systems have been designed as an alternative to the common ball bearing or sleeve bearing systems. Self-aligning bearing assemblies typically include a bearing having an outer surface which is at least partially spherical and a central opening into which the rotor shaft is journaled. This bearing is urged against a seat in the end bell by some type of spring device. Numerous spring retainers have been designed which are held in place by a separate bearing cap or are inserted by being twisted under projecting lugs in a hub formed by the end bell. However, it is desirable to devise a bearing retention system which does not require a separate retainer spring cap or a twisting motion to insert the retainer.

SUMMARY OF THE INVENTION

The present invention provides a self-aligning bearing assembly which is particularly suited for use with cast aluminum end bells of fractional horsepower electric motors. The assembly makes use of a spring retainer that retains a spherical bearing in the end bell by a mechanical lock. An undercut is machined or cast into the end bell to provide a locking means for the spring retainer. During assembly, tabs on the edge of the spring retainer are deformed radially inward as the retainer is inserted toward a spherical bearing and these tabs spring radially outward as the retainer reaches the undercut.

A self-aligning bearing assembly constructed in accordance with the present invention comprises a bearing having a partially spherical outer surface and a central opening for rotatably journaling a rotor shaft. A housing defines a generally cylindrical opening which has an internal surface that is radially spaced from the bearing. The housing includes a bearing seat adjacent to a portion of the outer surface of the bearing. The generally cylindrical opening is machined or cast to form a lip which lies adjacent to the internal surface of the opening. A spring bearing retainer for urging the bearing into contact with the bearing seat is constructed of resilient, flexible sheet-like material and has a generally planar body. The retainer includes a plurality of radially deformable projections which extend outwardly from the body and an aperture for receiving the shaft and being engagable with a second portion of the bearing outer surface. The generally cylindrical opening of the housing is so constructed as to permit the retainer to be moved axially into the opening toward the bearing seat so that the retainer portion forming the aperture may be brought into engagement with the second portion of the outer bearing surface and so that the projections on the spring retainer deform radially inward as the retainer is inserted into the housing and spring radially outward as the retainer approaches the undercut, thereby locking the retainer. In the locked position, the body of the retainer is axially deformed such that it exerts a force against the lip and resiliently retains the bearing against the bearing seat.

This invention also includes a method of assembling the above bearing assembly wherein the spring retainer is inserted in an axial direction into one end of the generally cylindrical opening of the bearing housing, the radially deformable projections on the spring retainer are deformed inwardly as the retainer passes into the housing and these projections subsequently spring outwardly as the retainer approaches an undercut in the housing, thereby locking the retainer such that it exerts a force against a lip formed by the undercut and resiliently retains the bearing against the bearing seat. Assembly of the bearing system is simplified since the retainer spring need not be twisted as it is inserted.

BRIEF DESCRIPTION OF THE DRAWINGS

FIG. 1 is a cross section of a self-aligning bearing assembly constructed in accordance with one embodiment of this invention;

FIG. 2 is a plan view of the spring bearing retainer of the assembly of FIG. 1;

FIG. 3 is a cross section of the spring bearing retainer of FIG. 2 taken along line III—III;

DESCRIPTION OF THE PREFERRED EMBODIMENT

Figure 4:
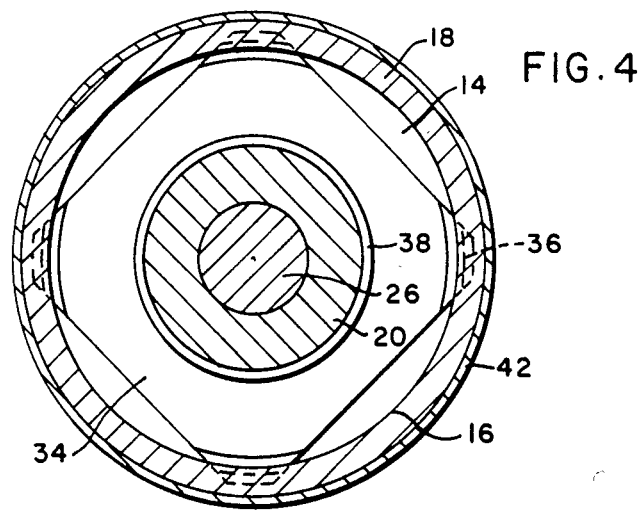
FIG. 4 is a cross section of the bearing assembly of FIG. 1, taken along line IV—IV.

Referring to the drawings, FIG. 1 is a cross section of a self-aligning bearing assembly constructed in accordance with this invention and mounted on one end of a fractional horsepower electric motor 10. A cast aluminum end bell 12 forms the bearing assembly housing and defines a generally cylindrical opening 14 having a machined undercut 16 which forms a lip 18 extending radially inward from the internal surface of the opening. A bearing 20 having a partially spherical outer surface 22 and a central opening 24, into which a rotor shaft 26 is journaled, is positioned against a bearing seat 28 formed in the end bell 12. The shaft 26 is connected to a rotor 30 that is centrally positioned with respect to a stator structure 32. The bearing seat 28 which lies adjacent to a first portion of the outer surface of the bearing is shaped to generally conform to that portion of the bearing surface. A bearing retainer 34 serves as means for urging the bearing into contact with the bearing seat and is constructed of resilient, flexible, sheet-like material having a generally planar body. The bearing retainer includes a plurality of radially deformable projections 36 extending outwardly from the body. A central portion 38 of the bearing retainer is shaped to conform to a second portion of the bearing outer surface and defines an aperture through which a portion of the bearing 20 and shaft 26 passes. The retainer body forms a second bearing seat adjacent to this aperture.

FIG. 2 is a plan view of the spring bearing retainer 34 which shows four radially deformable projections 36 positioned along the retainer periphery. FIG. 3 is a cross-sectional view of the retainer of FIG. 2 taken along line III—III. In FIG. 3, the radially deformable projections 36 can be seen to be bent at an acute angle 40 with respect to the plane of the body of the retainer.

Returning to FIG. 1, the undercut 16 which extends peripherally around the generally cylindrical opening 14 in the housing formed by the end bell 12 is shown to form a lip 18 having a depth which is approximately equal to the thickness of the radially deformable projections 36 on the spring retainer 34. Furthermore, the diameter of the cylindrical opening is preferably selected so that only the projections 36 are deformed radially inward as the spring retainer 34 is initially inserted axially into the opening 14 in the assembly housing.

The bearing assembly of FIG. 1 also shows an internal dust cap 42 which forms an interference fit with an internal surface of the end bell and is used to retain a fibrous lubricant material 44. A felt washer 46 is positioned adjacent to an outer end of the bearing and provides additional lubricant to the shaft and bearing.

FIG. 4 is a cross section of the bearing assembly of FIG. 1 taken along line IV—IV with the fibrous lubricant material removed. In this figure, lip 18 is shown to extend circumferentially adjacent to the inner surface of the generally cylindrical opening 14. Therefore, it is only necessary that the plane of the body of the spring retainer 34 is generally perpendicular to the shaft as the retainer is inserted into the generally cylindrical opening. The rotational orientation of the spring retainer is unimportant since the restraining lip is continuous around the circumference of the generally cylindrical opening.

Figure 5:
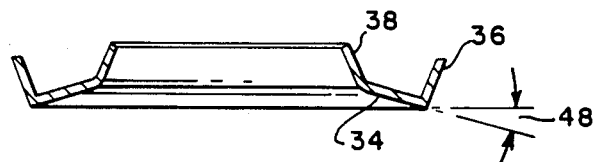
FIG. 5 is a cross section of the bearing retainer of FIG. 1.

FIG. 5 is a cross section of the retainer 34 as it appears in its final position. As it is inserted into the housing, projections 36 deform radially inward and slide along the internal surface of the generally cylindrical opening. When the central portion 38 of the retainer makes contact with the outer surface of the bearing, the outer edges of the retainer continues to move axially into the opening until projections 36 spring into the undercut and press against the lip 18 in FIG. 1. Therefore the retainer body bends at an acute angle 48 with respect to its initial plane, and the retainer exerts a force on the bearing which urges it against the bearing seat. After projections 36 are positioned against the lip, they continue to be partially deformed radially, thereby providing radial support for the bearing.

Figure 6:
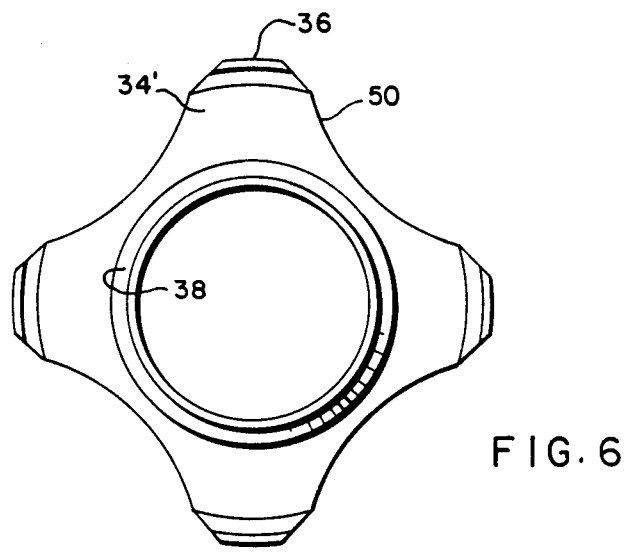
FIG. 6 is a plan view of an alternative spring bearing retainer for use in this invention.

FIG. 6 is a plane view of an alternative embodiment of the spring bearing retainer of this invention. In this embodiment, the generally planar body 34' includes a plurality of peripheral cut-outs 50. These cut-outs permit enhanced deflection of the individual retainer projections.

The method of assembling the bearing assembly of this invention comprises the steps of inserting a bearing having a partially spherical outer surface and having a central hole for rotatably journaling a shaft therein, into a generally cylindrical opening of a housing wherein the housing includes a lip extending radially inward from an internal surface of the opening and the housing further defines a bearing seat having a shape generally conforming to a first portion of the outer surface of the bearing. A resilient, flexible retainer of sheet-like material is inserted axially into the generally cylindrical opening of the housing. The retainer includes a generally planar body which initially lies in a plane generally perpendicular to the axis of the shaft. The retainer further includes a plurality of radially deformable projections extending outwardly from the retainer body and has an aperture which is engagable with a second portion of the bearing outer surface. As the retainer moves axially into the opening toward the seat, the projections are deformed radially inward. When the retainer aperture engages the bearing surface, the edges of the retainer continue to move axially, thereby bending the retainer body at an acute angle with respect to the generally perpendicular plane. As the retainer clears the lip, the projections spring radially outward such that the retainer exerts a force against the lip and resiliently retains the bearing against the bearing seat. After the projections are positioned against the lip, they continue to be partially deformed radially, thereby providing radial support for the bearing.

It will be apparent to those skilled in the art that this invention provides a bearing assembly which includes a cast end bell that is less expensive than the steel end bells used in prior art assemblies. This end bell can be manufactured in a simple casting operation. The final bearing assembly provides high radial support and uses a small number of parts which can be easily assembled to form a positive locking structure.

Although the present invention has been described in terms of what is at present believed to be its preferred embodiment, it will be apparent to those skilled in the art that various changes may be made without departing from the scope of the invention. For example, although a machined undercut was used to form the lip in the housing, this lip could have been easily cast into the housing. It is therefore intended that the appended claims cover such changes.

What is claimed is:

1. A self-aligning bearing assembly, comprising:
   a bearing having a partially spherical outer surface and having a central hole for rotatably journaling a shaft therein;
   a housing defining a generally cylindrical opening having an internal surface that is generally radially spaced from said bearing, said housing including a bearing seat adjacent to and generally conforming in shape with a first portion of the outer surface of said bearing;
   said housing having a lip formed by the internal surface of the generally cylindrical opening;
   a bearing retainer for urging said bearing into contact with said bearing seat, said retainer being of resilient, flexible, sheet-like material and initially having a generally planar body, having a plurality of radially deformable projections extending outwardly from said body, and having an aperture being engagable with said bearing outer surface;
   said housing being so constructed as to permit said retainer to be moved axially into the opening toward said seat so that said retainer portion forming said aperture may be brought into engagement with said outer bearing surface and so that said projections deform radially inward as said retainer is inserted into said housing and said projections spring radially outward as said retainer clears said lip;
   said lip being positioned with respect to said bearing such that when said retainer portion forming said aperture is in contact with said bearing surface and said projections are in contact with said lip, said retainer body is deformed axially at an acute angle with respect to its initial plane, whereby said retainer exerts a force against said lip and resiliently retains said bearing against said seat; and wherein said projections continue to be inwardly radially deformed when in contact with said lip, thereby providing radial support for said bearing.

2. A bearing assembly as recited in claim 1, further comprising:

lubricant supplying means disposed between said internal surface of said generally cylindrical opening and said bearing.

3. A bearing assembly as recited in claim 1, wherein said portion of said retainer defining said aperture forms a second bearing seat engaging said bearing outer surface.

4. A bearing assembly as recited in claim 1, wherein each of said retainer projections includes a tab bent at an acute angle with respect to the plane of said retainer body, said cylindrical opening having a diameter such that as said retainer is moved axially into the opening, and prior to the engagement of said retainer and said outer bearing surface, said retainer body remains generally planar while said tabs are deformed radially inward.

5. A bearing assembly as recited in claim 1, wherein said housing is a cast end bell for an electric motor, and said lip is formed by a cast portion of said housing.

6. A bearing assembly as recited in claim 1, wherein said bearing retainer includes a plurality of peripheral cut-outs between said radially deformable projections.

* * * * *